No. 677,571. Patented July 2, 1901.
G. W. HEFFNER.
BRIDGE CONSTRUCTION.
(Application filed Apr. 12, 1901.)
(No Model.) 4 Sheets—Sheet 1.
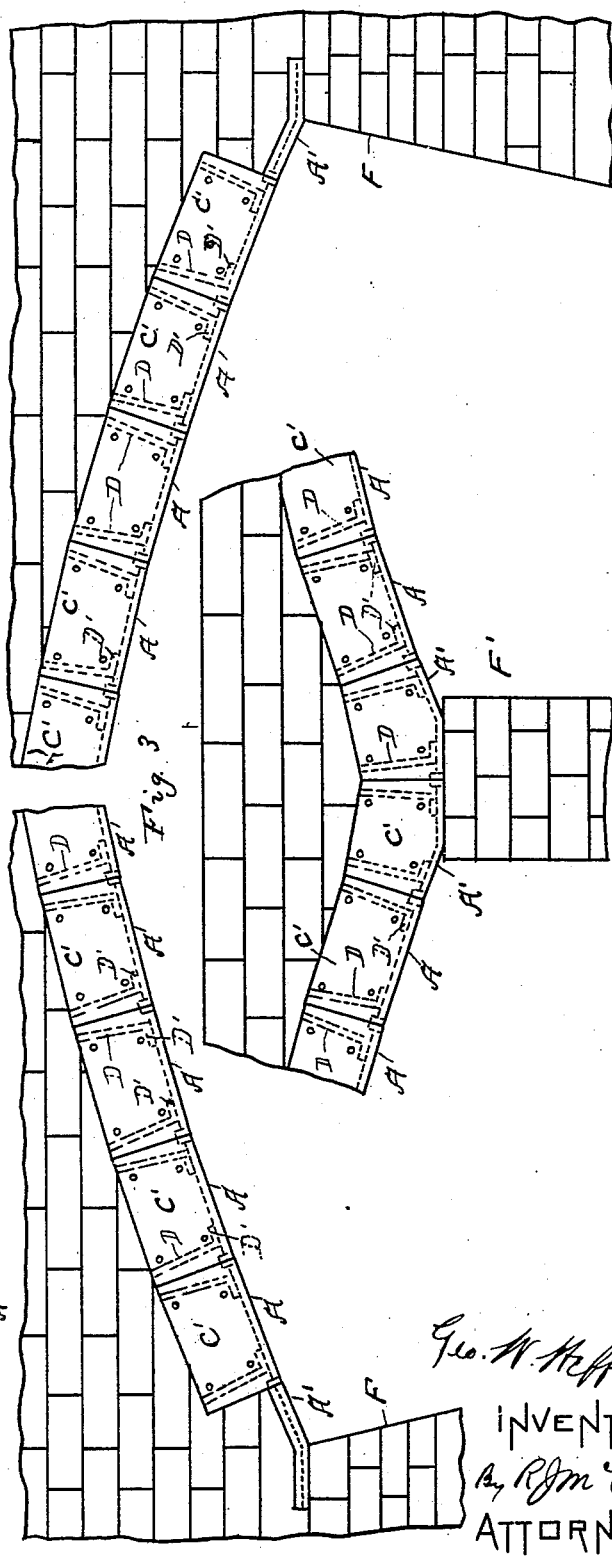

No. 677,571. Patented July 2, 1901.
G. W. HEFFNER.
BRIDGE CONSTRUCTION.
(Application filed Apr. 12, 1901.)
(No Model.) 4 Sheets—Sheet 2.
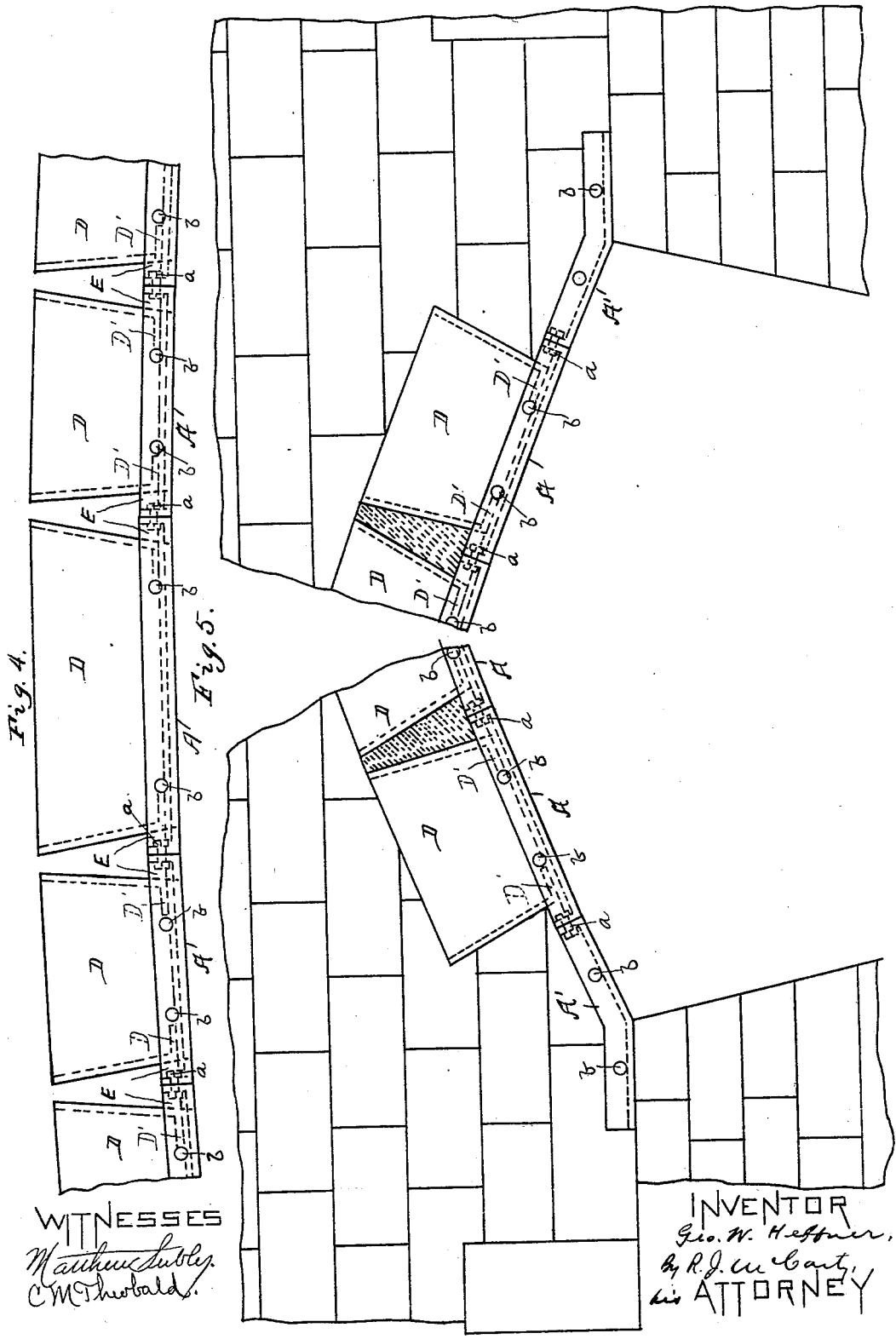

No. 677,571. Patented July 2, 1901.
G. W. HEFFNER.
BRIDGE CONSTRUCTION.
(Application filed Apr. 12, 1901.)
(No Model.) 4 Sheets—Sheet 3.
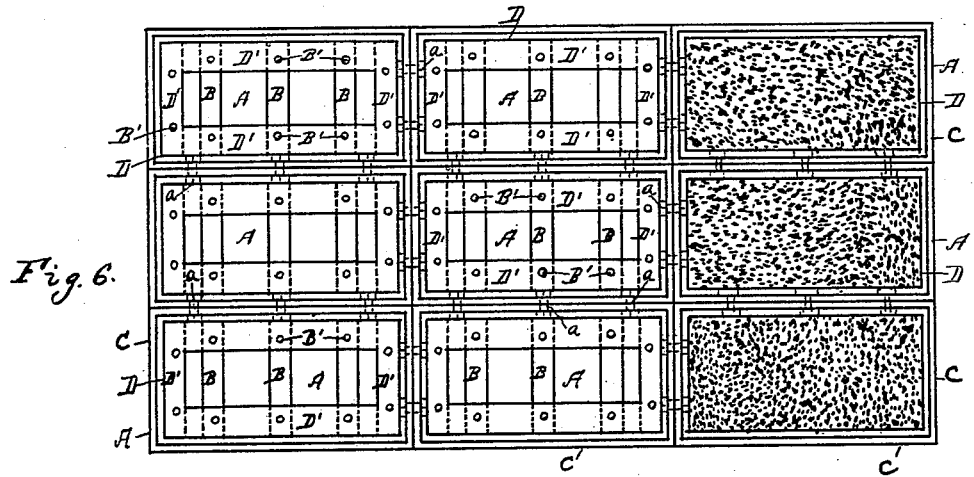
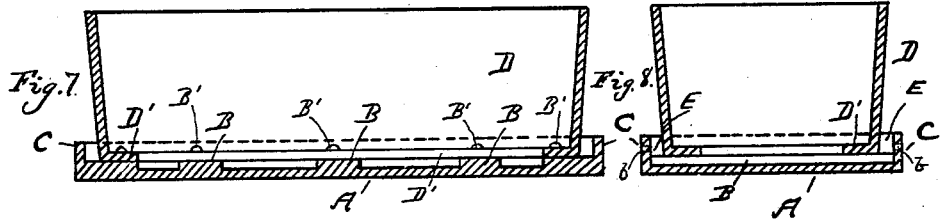
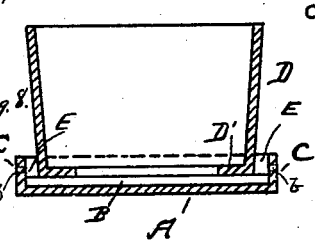
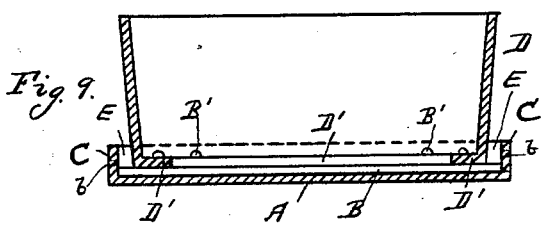
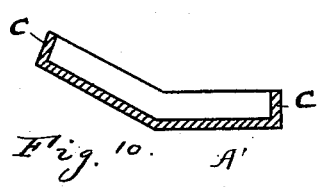
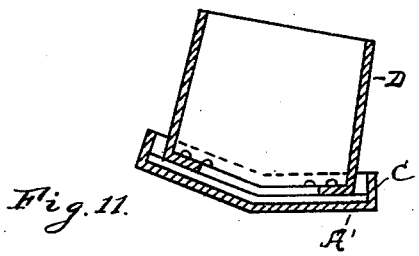
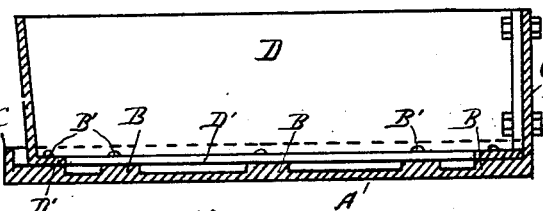
WITNESSES.
Matthew Sibly
C M Theobald
Geo. W. Heffner
INVENTOR.
By R. J. McCarty
his ATTORNEY.

No. 677,571. Patented July 2, 1901.
G. W. HEFFNER.
BRIDGE CONSTRUCTION.
(Application filed Apr. 12, 1901.)
(No Model.) 4 Sheets—Sheet 4.
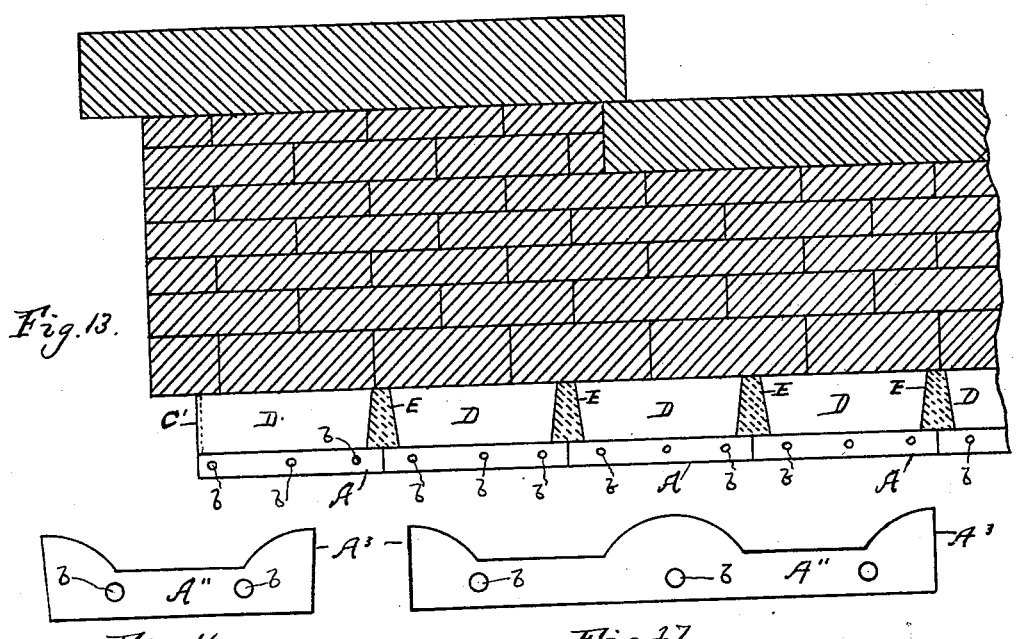
Fig. 13.
Fig. 16. Fig. 17.
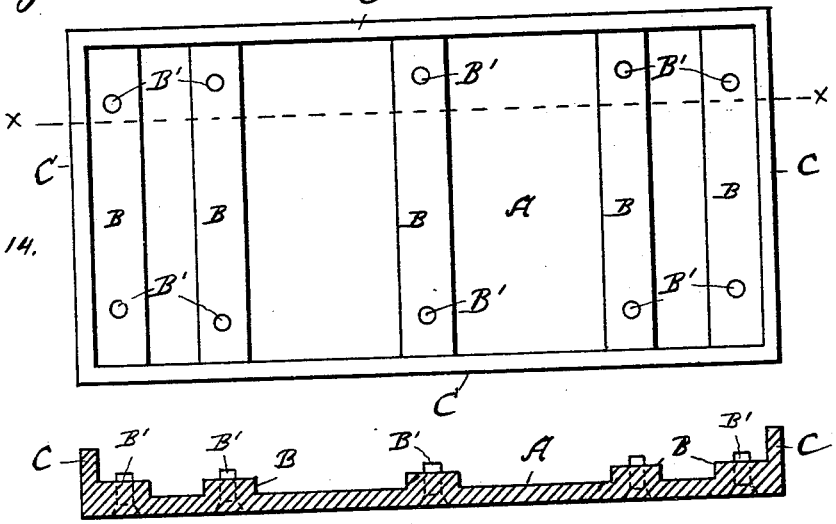
Fig. 14.
Fig. 15.
WITNESSES.
Matthew Sibler.
C. M. Theobald.
Geo. W. Heffner
INVENTOR.
By R. J. McCarty,
his ATTORNEY.

dinal side elevation showing the structure
UNITED STATES PATENT OFFICE.

GEORGE W. HEFFNER, OF DAYTON, OHIO.

BRIDGE CONSTRUCTION.

SPECIFICATION forming part of Letters Patent No. 677,571, dated July 2, 1901.

Application filed April 12, 1901. Serial No. 55,587. (No model.)

*To all whom it may concern:*

Be it known that I, GEORGE W. HEFFNER, a citizen of the United States, residing at Dayton, in the county of Montgomery and State of Ohio, have invented certain new and useful Improvements in Bridge Construction; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in bridge construction and possesses the new and useful improvements hereinafter described and claimed.

The bridge in its complete state is composed of iron, cement, and sand, and among the many advantages claimed therefor the following may be mentioned:

A bridge constructed in accordance with my invention has a maximum amount of strength and will last indefinitely. The construction employed enables a bridge of any width to be erected, and the strength of a bridge fifty or a hundred feet wide will be as great as at any less number of feet. The cost of construction is reduced to a minimum. All use of wooden floors or timber is avoided. There is no dead-weight to be supported by the structure, as it is keyed from abutment to abutment or from pier to pier. The use of the usual high piers is unnecessary. There is little or no part about the bridge requiring paint. Therefore the expense of repainting is reduced to a minimum, and finally a bridge made in accordance with my invention is firm to such an extent that no vibrations are manifest.

Preceding a detail description of my invention, reference is made to the accompanying drawings, of which—

Figure 1 is a longitudinal side elevation of the central portion of a bridge made in accordance with my invention, parts on both ends being broken away. Fig. 2 is a longitudinal side elevation showing two abutments brought together by breaking out the central portion of the structure. Fig. 3 is a longitudinal side elevation showing the structure connected with a pier in cases where the bridge is made of more than one span. Fig. 4 is an elevation similar to Fig. 1, but at an intermediate point between the two sides. Fig. 5 is an elevation similar to Fig. 2, but at an intermediate point between the two longitudinal sides. Fig. 6 is a top plan view showing several of the intermediate sections. Figs. 7 and 8 are longitudinal and cross-sectional views of one of the intermediate sections. Fig. 9 is a cross-sectional view of one of the central sections, as shown in either Figs. 1 or 4. Fig. 10 is a cross-sectional view showing a modified form of one of the abutment or pier sections. Fig. 11 is a cross-sectional view of one of the abutment or pier sections. Fig. 12 is a longitudinal sectional view of one of the side sections for the center of the arch as shown in Fig. 1. Fig. 13 is a transverse sectional view of a portion of the construction, showing the pavement projecting over the side sections. Fig. 14 is a plan view of one of the section base-plates. Fig. 15 is a longitudinal section on the line $x\,x$ of Fig. 14. Figs. 16 and 17 are end and side elevations, respectively, showing a modified form of section base-plate.

Throughout the specification similar reference-letters indicate corresponding parts.

The foundation or base of the construction consists of a series of metallic sections arranged in an arch and each of which is bolted firmly to the ends and sides of the four surrounding sections and each section forming a keystone, so that the entire construction may be said to consist of a series of key-sections throughout.

Referring more specifically to those sections, A designates the base-plate of one of such sections, which is constructed of cast-iron and has a series of strengthening-ribs B and four marginal flanges C. Each of the ribs B has a suitable number of studs B' projecting from the top side thereof. Secured to and within each of these base-plates is a receptacle D, having four flaring sides and bottom flanges D', with openings therein which receive the studs B', that project from the base-plates. When one of such receptacles D is united to a base-plate, there is a space E surrounding the lower portion of such receptacle and inclosed by the marginal flange C of the base-plate. Each of the intermediate sections, as shown in Fig. 6, is constructed in the above manner. The extreme side sections have some variations therefrom, as will hereinafter appear. Each section so made up is rigidly connected to the adjacent sections by means of bolts $a$, which pass through openings $b$ in the marginal flanges C of the base-plates. The construction of the extreme side sections is shown in Figs. 1, 2, 3, and 12, where it will be observed the marginal flange C' on the outer or exposed end extends up to the top of the side walls of the receptacle in order to provide a finished appearance throughout each side of the construction.

The base-plates A', (shown in Figs. 2, 3, 5, and 6,) it will be observed, are angular in end elevation or cross-section. This form of base-plate is used at the abutments F and piers F', where, it will be observed, one angle thereof rests upon such abutment or pier and the other angle projects out beyond the abutment or pier and assumes the necessary incline for connection with the adjacent sections, so that when all of the sections are placed in position and united, as hereinbefore described, an arch is completed in which every section between the two abutment-plates or between the abutment-plates and the pier-plates forms a keystone. The center section of the arch, as shown in Figs. 1 and 4, is wider than the remaining sections and occupies the position of the keystone in the usual construction of arch-bridges. As the sections are thus placed in position the metallic surfaces throughout the top and sides of the base-plates and the receptacles are covered with cement, as shown in Figs. 4, 5, 6, and 13. This cement layer fills all the spaces between the sections and also covers the inner surfaces of the said receptacles, so that the entire construction consists of a combination of metallic sections and cement. In addition to this a suitable quantity of grouting and sand, gravel, &c., is placed over all, after which it may be leveled off with the usual paving, consisting of cement, brick, or any other suitable material used for paving. The ends of the construction at the abutments are suitably anchored by earth, bricks, or stone, which gradually assumes a plane substantially on a level with the highest point of the arch, as shown in Figs. 1 and 2.

It will be seen from the several figures of the drawings that the lower end of each of the receptacles is of less dimension than the top. This is a very important feature of the construction, as thereby each section acts as a key to prevent any portion of the arch from weakening. Therefore the arch does not depend for its strength on the usual center keystone. The triangular spaces between the sections, as before stated, are filled with cement. These spaces between the sections gradually decrease in width upwardly, the upper limit of such spaces being approximately less than half the width of the lower limit. It will therefore be understood that when the entire structure is united and cement applied in the manner hereinbefore described the whole construction becomes one firm and unyielding arch, capable of withstanding the strain equally throughout.

In cases where it is desired to bridge smaller streams or construct aqueducts where a lighter construction will answer a form of base-plate shown in Figs. 16 and 17 will be found practicable. In this construction the receptacles D may be dispensed with. The base-plate A'' has higher extended flanges $A^3$. These base-plates are united in the same way and the marginal flanges $A^3$ are of sufficient height to provide the necessary spaces for the application of cement.

Having fully described my invention, what I desire to secure by Letters Patent is—

1. In a bridge construction, a series of base-plates having marginal flanges projecting therefrom, a series of receptacles secured within said base-plates and having outwardly-tapering sides, each of said base-plates and receptacles forming a section, and the said sections being united at the marginal flanges, whereby there is provided a structure consisting of a series of sections between which are provided spaces adapted to contain cement, the spaces at the upper portions of said receptacles being smaller than at the lower portions whereby each section constitutes a key in the arch, substantially as specified.

2. In a bridge construction, a series of base-plates having marginal flanges and united in the form of an arch, the central ones of such base-plates being of larger dimensions than the remaining ones, the base-plates adjacent to the abutments or piers being angular in cross-section so as to provide a connection with a pier or abutment, a series of receptacles secured to said base-plates, the walls of said receptacles tapering outwardly so as to provide suitable spaces between said receptacles, the said spaces being of greater width adjacent to the base-plates, and the said spaces being filled with cement throughout, the interior of the receptacles also being covered with cement, and a layer of sand or gravel throughout the upper sides of said receptacles.

3. In a bridge construction, a series of base-plates having marginal flanges by means of which the plates are united in the form of an arch, the line of centermost plates in the arch being of larger dimensions than the remaining plates, and the plates on each extreme end of the arch being angular in cross-section whereby a portion of said end plates is supported on the abutments or piers, the marginal flanges of said plates being of a tapering form so as to provide suitable intervening spaces between said plates, the said spaces being of larger area adjacent to the bottom of the plates, and cement throughout said spaces whereby the entire structure becomes firmly united, and each of such plates acts as a key to hold the adjacent plates in the arch.

In testimony whereof I affix my signature in presence of two witnesses.

GEORGE W. HEFFNER.

Witnesses:
R. J. McCARTY,
J. A. WORTMAN.